United States Patent
Dietz et al.

(10) Patent No.: US 6,221,144 B1
(45) Date of Patent: Apr. 24, 2001

(54) CONDUCTIVE PIGMENTS

(75) Inventors: Johann Dietz, Dietzenbach; Wilhelm Goebel, Gross-Bieberau; Ralf Glausch; Reiner Vogt, both of Darmstadt, all of (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/271,157

(22) Filed: Mar. 17, 1999

(30) Foreign Application Priority Data

Mar. 18, 1998 (DE) ............................................... 198 11 693
Mar. 18, 1998 (DE) ............................................... 198 11 694

(51) Int. Cl.$^7$ ...................................................... C09C 3/06
(52) U.S. Cl. ......................... 106/417; 106/415; 106/461; 106/462; 106/482; 252/520.1; 428/403; 428/404; 428/406
(58) Field of Search ...................................... 106/415, 417, 106/461–462, 482; 252/520.1; 428/403, 404, 406

(56) References Cited

U.S. PATENT DOCUMENTS

| 5,350,448 | | 9/1994 | Dietz et al. ........................... 106/441 |
|---|---|---|---|
| 5,472,640 | | 12/1995 | Brueckner et al. ................... 252/518 |
| 5,565,144 | * | 10/1996 | Feist et al. ............................ 252/518 |
| 5,569,412 | * | 10/1996 | Feist et al. ............................ 252/518 |
| 5,571,456 | * | 11/1996 | Bergmann et al. ................... 252/518 |
| 5,720,904 | * | 2/1998 | Jones ................................. 252/520.1 |
| 5,945,035 | * | 8/1999 | Vogt et al. ......................... 252/520.1 |

OTHER PUBLICATIONS

English Abstract of DE 44 35 301 A (Apr. 1996).

* cited by examiner

*Primary Examiner*—Anthony Green
(74) *Attorney, Agent, or Firm*—Millen White Zelano & Branigan

(57) ABSTRACT

A pale electrically conductive pigment consisting of a substrate and an electrically conductive layer formed of phosphorus- and/or fluorine-doped tin oxide. There may be an interlayer disposed between the substrate and the conductive layer.

15 Claims, No Drawings

CONDUCTIVE PIGMENTS

The invention relates to electrically conductive pigments having a tin oxide layer doped with fluorine and phosphorus as a conductive layer on a substrate.

BACKGROUND OF THE INVENTION

In many sectors of industry there is a need for conductive pigments which can be used, for example, to produce plastics, lacquers, coatings or fibers or the like which are electrically conductive or antistatic or which screen against electromagnetic waves. Conductive carbon black is employed for this purpose in large amounts and yet because of its high light absorption cannot be used for pale or colored coatings. A further disadvantage is the strong absorption of carbon black in the IR region, which in the case, for example, of solar irradiation leads to frequently unwanted warming of the coated articles.

For pale conductive coatings, therefore, the use of doped metal oxides, especially antimony-doped tin oxide, is on the increase.

U.S. Pat. No. 5,472,640 describes conductive platelet-shaped pigments: a platelet-shaped substrate coated with one or more metal oxide layers is coated with a conductive layer of antimony-doped tin oxide, with a thin $SiO_2$ layer disposed between the conductive layer and the metal oxide layer.

U.S. Pat. No. 5,350,448 discloses a pale, electrically conductive pigment consisting of a platelet-shaped substrate and halogen-doped tin and/or titanium dioxide as the conductive layer. The specific resistance of the pigment is given as less than 25 k$\Omega$cm.

DE 44 35 301 describes electrically conductive pigments having a phosphorus-doped tin oxide layer as a conductive layer on a substrate. The specific resistance of the pigments is given as less than 10 k$\Omega$cm.

The pale conductive pigments of the prior art have levels of electrical conductivity which fail to satisfy the stringent requirements of certain conductive coatings.

SUMMARY OF THE INVENTION

It is an object of the present invention to provide pale conductive pigments having better conductivity.

This object is achieved in accordance with the invention by pale, conductive pigments in which a substrate is coated with a conductive layer and which are characterized in that the layer consists of a phosphorus- and/or fluorine-doped tin oxide layer. It is possible for an interlayer to be disposed between the substrate and the conductive layer.

This object is further achieved in accordance with the invention by a process for preparing the pigments of the invention by suspending the substrate in water and metering in a solution of a hydrolyzable tin salt, the aqueous solution of a phosphorus compound and/or the aqueous solution of a fluoride, with the pH of the substrate suspension being kept constant within a range from 1 to 5 by simultaneous addition of acid or base, and separating off the coated substrate, washing it, drying it and calcining it in the absence of oxygen at temperatures from 400 to 1100° C.

This object is further achieved in accordance with the invention by a process for preparing the pigments of the invention by suspending the substrate in water and metering in the aqueous solution of a silicate, with the pH being held constant within a range from 4 to 10 by simultaneous addition of acid, and then metering in a solution of a hydrolyzable tin salt, the aqueous solution of a phosphorus compound and/or the aqueous solution of a fluoride, the pH of the substrate suspension being held constant within a range from 1 to 5 by simultaneous addition of acid or base, and separating off the coated substrate, washing it, drying it and calcining it in the absence of oxygen at temperatures from 400 to 1100° C.

This object is additionally achieved, in accordance with the invention, by a process for preparing the pigments of the invention by suspending the substrate in water and, following addition of a complexing agent, metering in a barium salt solution, with the pH being held constant within a range from 0 to 5 by simultaneous metered addition of dilute sulfuric acid and sodium sulfate, and then adding a solution of a hydrolyzable tin salt, the aqueous solution of a phosphorus compound and the aqueous solution of a fluoride, the pH of the substrate suspension being held constant within a range from 1 to 5 by simultaneous addition of acids or base, and separating off the coated substrate, washing it, drying it and calcining it in the absence of oxygen at temperatures from 400 to 1100° C.

Upon further study of the specification and appended claims, further objects and advantages of this invention will become apparent to those skilled in the art.

The invention additionally provides for the use of the pigments of the invention for pigmenting paints, printing inks, plastics, glazes for ceramics, and glasses and cosmetics. For these purposes they can also be employed as mixtures with commercially customary pigments, examples being organic and inorganic absorption pigments, metal effect pigments and LCP pigments.

Both platelet-shaped and spherical particles or mixtures thereof can be used as substrates. All known platelet-shaped substrate materials, such as metals, metal oxides, mica pigments and synthetic platelets, can be coated by the process of the invention and may already be coated with metal oxides. Examples of these materials are natural or synthetic mica, other phyllosilicates such as talc, kaolin or sericite, or other, comparable materials such as platelet-shaped iron oxide, aluminum flakes, bismuth oxychloride, or $SiO_2$, glass or synthetic ceramic flakes.

Particularly preferred substrates are mica and platelet-shaped pigments and also $SiO_2$ flakes prepared in accordance with the International Application WO 93/08237. They consist of a transparent, inorganic platelet-shaped matrix, preferably silica, which may include an insoluble colorant. If, say, a highly transparent conductive pigment is to be prepared, a platelet-shaped substrate material is used whose matrix consists solely of silica. These conductive pigments are particularly suitable for producing electrically conductive clearcoats or transparent electrode layers.

Alternatively, if the requirement is for a pale conductive pigment of high hiding power, insoluble colorants, examples of which are titanium dioxide particles, are incorporated into the transparent matrix. The advantage of this preferred substrate material is that a substrate material which is itself of high hiding power can be used to prepare the pigment of the invention.

Since there is no need for high forces in the process, it is also outstandingly suited to the coating of pearl luster pigments. All customary pearl luster pigments can be used, such as micas coated with colored or colorless metal oxides, such as $TiO_2$, $Fe_2O_3$, $SnO_2$, $Cr_2O_3$, ZnO and other metal oxides, alone or in combination in one uniform layer or in successive layers. These pigments are known, for example, from the German patents and patent applications 14 67 468, 19 59 998, 20 09 566, 2 14 545, 22 15 191, 2 44 298, 23 13

331, 25 22 572, 32 11 602 and 32 35 017 and are obtainable commercially, for example under the trade name Iriodin® from the MERCK KGaA, Darmstadt.

The spherical particles may consist, for example, of $SiO_2$ or metal oxides, such as $Fe_2O_3$, $TiO_2$, $MgTiO_3$, $CaTiO_3$, $BaTiO_3$, $SrTiO_3$, $Al_2O_3$ or $BaSO_4$, $CaSO_4$ or $CaCO_3$.

The particles preferably have an average diameter of less than 200 µm and, in particular, not more than 50 µm. Platelet-shaped substrates preferably have an extent in the main dimension of less than 500 µm and, in particular, less than 250 µm and their thickness preferably is less than 10 µm, preferably not more than 5 µm and, in particular, in the range 0.01–1 µm. The ratio of the extent in the main dimension to the thickness (aspect ratio) of the platelet-shaped substrates is more than 3 and, in particular more than 5.

The substrates to be coated may also consist of a mixture of platelet-shaped and spherical particles, in which case the ratio of platelet-shaped to spherical particles is preferably within the range from 80:20 to 20:80 and, in particular, is 50:50.

In one particular embodiment of the pigment it is possible between the substrate and the conductive layer to have an interlayer, for example, of barium sulfate, silica or an insoluble silicate, such as aluminum silicate, which acts as a diffusion barrier between substrate and conductive layer.

The process to be employed for applying the silica layer is as follows: a solution of a water-soluble silicate, preferably a sodium waterglass solution, is metered into a suspension of the substrate to be coated which is heated at about 50 to 100° C., in particular 70 to 80° C. By simultaneous addition of 10% strength hydrochloric acid the pH is held constant at from 4 to 10, preferably from 6.5 to 8.5. Following addition of the silicate the mixture is stirred for a further 30 minutes.

The silica layer applied in this way should account for at least about 5% by weight, calculated as $SiO_2$ and based on the substrate, of the pigment. There are no upper limits although it is found that no further increase in conductivity can be brought about by very thick $SiO_2$ layers. Preference is therefore given to silica layers of about 5–20% by weight, in particular about 10%.

The barium sulfate layer, when present, is preferably applied by process described in U.S. Pat. No. 5,380,360. In this process, a complexing agent, preferably citric acid, is added to a substrate suspension which is heated at about 50 to 95° C., in particular from 60 to 80° C., and then the aqueous solution of a barium salt, and a sodium sulfate solution containing sulfuric acid, are metered in separately. The substrate coated with barium sulfate is then coated with doped tin oxide in the manner described above.

In accordance with this embodiment of the invention the barium sulfate content of the pigment is from 0.1 to 50% by weight based on the pigment. This corresponds to a layer thickness of from about 10 to 100 nm.

The substrates are coated in accordance with known processes by suspending them in water and coating them first with silica, a silicate or barium sulfate and then, at elevated temperature and an appropriate pH, adding the solution of a water-soluble tin salt, a water-soluble phosphorus compound and/or a water-soluble fluoride, with the pH being kept within the appropriate range by simultaneous addition of an acid or base if required.

In the case of the embodiment of the pigment without an interlayer, the substrates are suspended in water and—preferably at elevated temperature and an appropriate pH—the solution of a water-soluble tin salt, of a water-soluble phosphorus compound and of a fluoride is added, the pH being kept within the appropriate range by simultaneous addition of an acid or base if required.

It is judicious to use the bases which are readily available industrially, such as NaOH, KOH or ammonia, for example, and as acids to use dilute mineral acids. Since the bases and acids serve only to alter the pH their nature is not critical, and so other acids and bases can also be employed.

Suitable tin salts are the 2- and 4-valent halides, sulfates or nitrates, preferably the halides and especially the chlorides. Particular preference is given to a tin salt solution consisting of $SnCl_4$ and $SnCl_2$ in which the ratio of $Sn^{IV}$ to $Sn^{II}$ is in the range from 90:10 to 10:90, in particular from 80:20 to 60:40, and further preference to solutions comprising only tin(IV) salts. The tin salts can also be added in solid form to the aqueous substrate suspension.

Suitable phosphorus compounds are the phosphorus trihalides, phosphoryl halides, the oxygen acids of the phosphorus, and sodium phosphates. It is preferred to use the readily available and inexpensive phosphoric acid or sodium phosphate.

Suitable fluorine compounds are alkali metal fluorides and ammonium fluoride, the latter being preferred.

The conductive layer of phosphorus- and fluorine-doped tin oxide is applied to the substrate in an amount of from 10 to 200% by weight, preferably from 50 to 75% by weight, based on the substrate. Larger amounts, although possible per se, do not bring about any further increase in conductivity.

The ratio of fluorine to phosphorus in the conductive layer is from 10:1 to 1:100, in particular from 3:10 to 5:100. The ratio of the sum of the two dopants to tin is from 0.1:100 to 10:100, in particular from 1:100 to 5:100.

If the content of phosphorus or fluoride is too low it is impossible to achieve high conductivities, whereas with too high a phosphorus or fluoride content the conductivity drops sharply.

If only phosphorus is used as a dopent, its preferred proportion in the conductive layer relative to tin is from 0.1 to 20 atom %, more preferably from 1 to 10 atom % and, in particular, from 2 to 8 atom %. If only fluoride is employed as a dopant, its preferred proportion in the conductive layer is from 0.1 to 2.5% by weight, more preferably from 0.5 to 1% by weight.

The desired homogeneous distribution of tin, fluoride and/or phosphorus in the conductive layer can easily be achieved by metering the tin, fluoride and/or phosphorus compounds in water—either together in a solution or in separate solutions—continuously and in a predetermined mixing proportion to the substrate suspension at an appropriate pH of about 1 to 5 and an appropriate temperature of about 50 to 90° C. in such a way that hydrolysis and deposition on the substrate take place directly in each case.

Any acid or base can be used to precipitate the metal salts. The optimum concentrations and pH values can be determined by means of routine experiments. The pH, once established for the precipitation, is usually retained throughout the entire precipitation, in order to obtain uniform pigments.

After the end of coating, the pigments are separated off from the suspension, washed, dried and calcined in the absence of oxygen at temperatures of 400–1100° C., preferably 900–1000° C., for from 15 minutes to 5 hours.

Depending on the choice of starting material and the thickness of the doped tin oxide layer the pigments of the invention are yellowish, silver colored, pale grey or pale grey-brown.

In addition to phosphorus and/or fluorine and tin oxide the conductive layer may also comprise other metal oxides too. For example, it may be advantageous to add other metal oxides, such as alumina, iron oxide, zirconium oxide or chromium oxide, to the said outer layer in order to increase the thermal and/or mechanical stability and/or to generate specific color effects. Since these additions generally increase the specific resistance of the pigments, their proportion by mass in the outer layer is preferably chosen to be not too high and less than 25% by weight. Particular preference is given to pigments in which such additions account for less than 10% by weight and, in particular, less than 5% by weight.

The phosphorus- and/or fluorine-doped tin oxide layer gives the pigments of the invention high conductivity. The specific resistance is in every case less than 1 kΩcm. In general, levels of less than 300 Ωcm are obtained.

For measuring the specific resistance of the pigments, a small amount—about 0.5 g—of pigment is compacted between two metal dies in an acrylic glass tube having a diameter of 2 cm with the aid of a 10 kg weight. The electrical resistance R of the pigments pressed in this way is measured. From the layer thickness L of the compressed pigment, the specific resistance p is given by the relationship $$\zeta = R \cdot \frac{\pi \cdot (d/2)^2}{L} \quad [\text{ohm} \cdot \text{cm}]$$

The pigments of the invention are notable not only for their high electrical conductivity but also for a coloring which is optimizable and a hiding power which is optimizable with a view to the respective application. Depending on their specific design, the pigments of the invention can be used for a whole range of different applications, such as for transparent electrodes for driving liquid-crystal displays, for example, for antistatic coatings, or for antistatic plastics, floor coverings, etc. In addition they are used in paints, lacquers, printing inks and plastics.

The invention therefore likewise provides formulations which comprise the pigments of the invention. The pigments of the invention frequently meet the requirements arising during the respective applications better than do conventional pigments, and in any case represent a considerable broadening of the pool of such compounds that is available to the person skilled in the art. Accordingly, considerable economic significance is attached to the compounds of the invention.

The possible uses listed for the pigments of the invention should be understood merely as examples and are intended to illustrate rather than to limit the invention. Whatever the specific profile of requirements for a particular application, however, the person skilled in the art can vary the properties of the pigments within a broad range and can optimize them with a view to the respective application.

The entire disclosure of all applications, patents and publications, cited above and below, and of corresponding German Application Nos. 198 11 693.4 and 198 11 694.2, both filed March 18,1998 are hereby incorporated by reference.

The examples which follow are intended to illustrate the invention without limiting it.

EXAMPLES

In the foregoing and in the following examples, all temperatures are set forth uncorrected in degrees Celsius; and, unless otherwise indicated, all parts and percentages are by weight.

Example 1

100 g of $SiO_2$ flakes (particle size 1–40 μm) are suspended in 2 l of water. At a pH of 2.3 200 ml of an aqueous solution consisting of 112 g of $SnCl_4 \cdot 5H_2O$, 15 g of $SnCl_2 \cdot 2H_2O$, 50 ml of concentrated HCl, 0.2 g of 85% strength $H_3PO_4$ and 4.0 g of $NH_4F$ are metered in to the suspension at 75° C. During the hydrolysis the pH is held constant by addition of NaOH. After the end of coating, the product is filtered off with suction, washed with water, dried and calcined under nitrogen at 1000° C. for 30 minutes. Calcination gives a pale pigment having a specific powder resistance of 100 ohm·cm.

Example 2

100 g of mica having a particle size of 10–60 μm are suspended in 2 l of water and the suspension is heated to 75° C. Subsequently a pH of 1.8 is established and 1 g of citric acid monohydrate is added. This is followed by the simultaneous but separate addition of 11.8 g of $Na_2SO_4$ and 1.3 g of concentrated $H_2SO_4$ in 180 ml of water and of 105 g of $BaCl_2 \cdot 2H_2O$ in 300 ml of water, the pH remaining constant. After the end of the addition the product is allowed to settle, the supernatant solution is decanted, and the system is made up with fresh water. This gives a mica coated with a layer of $BaSO_4$.

This suspension is heated to 75° C. again and adjusted to pH of 2.3. Subsequently, 200 ml of an aqueous solution consisting of 112 g of $SnCl_4 \cdot 5H_2O$, 15 g of $SnCl_2 \cdot 2H_2O$, 50 ml of concentrated HCl, 0.2 g of 85% $H_3PO_{44}$ and 4.0 g of $NH_4F$ are metered in. During the hydrolysis the pH is held constant by addition of NaOH. After the end of coating, the product is filtered off with suction, washed with water, dried and calcined under nitrogen at 1000° C. for 30 minutes. Calcination gives a pale pigment having a specific powder resistance of 50 Ωcm.

Example 3

100 g of mica (particle size 10–60 μm) are suspended in 2 l of water, the suspension is heated to 75° C., and 400 ml of a hydrochloric acid solution containing 84.6 g of $SnCl_4 5H_2O$, 6 g of $SnCl_2 \cdot 2H_2O$ and 100 ml of concentrated HCl are added continuously with stirring over the course of 4 hours. At the same time, an $NH_4F$ solution (4.0 g of $NH_4F$ and 300 ml of $H_2O$) is metered into the mica suspension from another vessel over 4 hours. Throughout the reaction period the pH is held constant at 1.8 using 15% NaOH. Nitrogen is passed over the suspension during the reaction. The suspension is stirred at 75° C. for 30 minutes and then allowed to settle for 10 hours. Subsequently, the solid is filtered off, washed with about 20 ml of water until free from chloride, and dried at 110° C. The resulting product is calcined at 500° C. This gives a pigment having a specific powder resistance of 9000 ohm·cm.

Example 4

50 g of $SiO_2$ flakes (particle size 1–40 μm) are suspended in 2 l of water. At a pH of 2.0 200 ml of an aqueous solution consisting of 70 g of $SnCl_4 5H_2O$, 12 g of $SnCl_2 \cdot 2H_2O$, 10 ml of concentrated HCl and 0.1 g of 85% $H_3PO_4$ are metered in to the suspension at 75° C. During the hydrolysis the pH is held constant by addition of NaOH. After the end of coating, the product is filtered off with suction, washed with water, dried and calcined under nitrogen at 1000° C. for 30 minutes.

Calcination gives a pale, slightly grey-brown pigment having a specific powder resistance of 180 ohm·cm.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A pale-colored, electrically conductive pigment comprising a substrate coated with a conductive layer, wherein the conductive layer is a phosphorus- and fluorine-doped tin oxide layer.

2. A pigment according to claim 1, wherein an interlayer is disposed between the substrate and the conductive layer.

3. A pigment according to claim 1, wherein phosphorus and fluorine are provided in a weight ratio to tin of from 0.1:100 to 10:100.

4. A pigment according to claim 1, wherein the fluorine and phosphorus are provided in a weight ratio from 10:1 to 1:100.

5. A pigment according to claim 1, wherein the content of tin oxide relative to the substrate is from 10 to 200% by weight.

6. A pigment according to claim 1, wherein the substrate is platelet-shaped.

7. A pigment according to claim 6, wherein the platelet-shaped substrate is mica, synthetic mica, $SiO_2$ flakes, glass flakes, ceramic flakes or a pearl luster pigment.

8. A pigment according to claim 1, wherein the substrate consists of spherical particles of $Al_2O_3$, $BaSO_4$ or $SiO_2$.

9. A pigment according to claim 1, wherein the substrate is a mixture of platelet-shaped and spherical particles.

10. A pigment according to claim 2, wherein the interlayer consists of barium sulfate, silica or another insoluble layer.

11. A pigment according to claim 10, wherein the interlayer is present in an amount of from 5 to 20% by weight, based on the substrate.

12. A process for preparing the pigment according to claim 1, which comprises suspending the substrate in water and a solution of hydrolyzable tin salt, metering in an aqueous solution of a phosphorus compound and/or aqueous solution of a fluoride with the pH of the substrate suspension being held constant within a range from 1 to 5 by simultaneous addition of acid or base, separating off a resulting coated substrate and washing, drying and calcining the coated substrate in the absence of oxygen at a temperature from 400 to 1100° C.

13. A process for preparing the pigment according to claim 2, with a silicate interlayer which comprises suspending the substrate in water and metering in an aqueous solution of a silicate with the pH being held constant within a range from 4 to 10 by simultaneous addition of acid, and then metering in a solution of hydrolyzable tin salt and aqueous solution of a phosphorus compound and/or aqueous solution of a fluoride with the pH of the substrate suspension being held constant within a range from 1 to 5 by simultaneous addition of acid or base, separating off a resulting coated substrate and washing, drying and calcining the coated substrate in the absence of oxygen at a temperature from 400 to 1100° C.

14. A process for preparing the pigment according to claim 2 with a barium sulfate interlayer, which comprises suspending the substrate in water and, following the addition of a complexing agent, metering in a barium salt solution with the pH being held constant within a range from 0 to 5 by simultaneous metered addition of dilute sulfuric acid and sodium sulfate, and then metering in a solution of a hydrolyzable tin salt and aqueous solution of a phosphorus compound and/or aqueous solution of a fluoride with the pH of the substrate being held constant within a range from 1 to 5 by simultaneous addition of acid or base, separating off the coated substrate and washing, drying and calcining the coated substrate in the absence of oxygen at a temperature from 400 to 1100° C.

15. A paint, printing ink, plastic, cosmetic glaze for ceramics or glass composition which is pigmented with a pigment according to claim 1.

* * * * *

UNITED STATES PATENT AND TRADEMARK OFFICE
CERTIFICATE OF CORRECTION

PATENT NO. : 6,221,144 B1
DATED : April 24, 2001
INVENTOR(S) : Dietz et al.

It is certified that error appears in the above-identified patent and that said Letters Patent is hereby corrected as shown below:

<u>Column 8,</u>
Line 1, reads "cosmetic glaze" should read -- cosmetic, glaze --
Line 11, reads "separating off the" should read -- separating off a resulting --;

Signed and Sealed this

Ninth Day of July, 2002

*Attest:*

*Attesting Officer*

JAMES E. ROGAN
*Director of the United States Patent and Trademark Office*